(12) United States Patent
Goto

(10) Patent No.: US 6,173,697 B1
(45) Date of Patent: Jan. 16, 2001

(54) FAIL-SAFE SYSTEM FOR ENGINE

(75) Inventor: Kenichi Goto, Kanagawa (JP)

(73) Assignee: Nissan Motor Co. Ltd., Yokohama (JP)

( * ) Notice: Under 35 U.S.C. 154(b), the term of this patent shall be extended for 0 days.

(21) Appl. No.: 09/379,323

(22) Filed: Aug. 23, 1999

(30) Foreign Application Priority Data

Aug. 25, 1998 (JP) .................................................. 10-238417

(51) Int. Cl.⁷ ...................................................... F02D 1/00
(52) U.S. Cl. ...................................... 123/396; 123/339.15
(58) Field of Search .............................. 123/396, 339.15; 701/107

(56) References Cited

U.S. PATENT DOCUMENTS

| | | | |
|---|---|---|---|
| 5,154,150 | * 10/1992 | Vieira | 123/396 |
| 5,163,402 | * 11/1992 | Taguchi et al. | 123/396 |
| 5,755,201 | * 5/1998 | Knoss et al. | 123/396 |
| 5,775,293 | * 7/1998 | Kresse | 123/396 |
| 5,823,164 | * 10/1998 | Seki et al. | 123/396 |
| 6,047,679 | * 4/2000 | Matsumoto et al. | 123/396 |
| 6,065,448 | * 5/2000 | Hatton et al. | 123/396 |

\* cited by examiner

Primary Examiner—John Kwon
(74) Attorney, Agent, or Firm—Foley & Lardner

(57) ABSTRACT

A fail-safe system for an internal combustion engine mounted on an automotive vehicle. The fail-safe system comprises a device for causing the engine to generate an engine power output. A detector is provided to detect an operational condition of the causing device so as to generate a detection signal representative of the operational condition. Additionally, a control unit is provided to be programmed to carry out (a) judging that an abnormality arises in the causing device, in accordance with the detection signal from the operational condition detector, so as to make a first judgment result, (b) putting the causing device into a fail-safe condition upon the first judgement result being made, (c) judging that a command for releasing the fail-safe condition is provided, so as to make a second judgment result, (d) judging that the vehicle is in a stopping condition, so as to make a third judgment result, and (e) releasing the fail-safe condition for the causing device upon both the second and third judgment results being made.

7 Claims, 2 Drawing Sheets

FAIL-SAFE SYSTEM FOR ENGINE

BACKGROUND OF THE INVENTION

This invention relates to improvements in a fail-safe system in an electronic control system for an engine, and more particularly to the fail-safe system in which a fail-safe condition can be suitably accomplished.

Most automotive vehicles are equipped with an electronic control system which electronically controls an engine power output system including an internal combustion engine. The engine includes a device for causing the engine to generate an engine power output, for example, one relating to fuel injection control (such as an electronically controlled throttle device, or a fuel injector valve), one relating to spark timing control (such as s spark plug), and one relating to idling engine speed control (such as an auxiliary air control valve).

The electronic control system is usually provided with a fail-safe system which is adapted to put the engine power output causing device into a fail-safe condition or mode when it is detected that an abnormality or trouble arises in the engine power output causing device. In such the fail-safe condition, for example, the engine power output is lowered by fixing the opening degree of a throttle valve of the electronically controlled throttle device to a certain small level, by minimizing a quantity of fuel injected from the fuel injector valve, or by retarding the spark timing of the spark.

SUMMARY OF THE INVENTION

In the above conventional fail-safe system, releasing the fail-safe condition for the engine power output causing device is accomplished as occasion demands, for example, after the trouble has been solved upon repairing the engine power output causing device in a repair shop. It is desired that the fail-safe condition cannot be released in case that the fail-safe condition is required in order to achieve a safe control for the engine.

It is, therefore, an object of the present invention to provide an improved fail-safe system for an engine of a vehicle, which can improve safety in conventional fail-safe systems.

Another object of the present invention is to provide an improved fail-safe system for an engine of a vehicle, which can release a fail-safe condition for an electronically controlled mechanism, in such a suitable manner as to improve safety in engine operational control.

A further object of the present invention is to provide an improved fail-safe system for an engine of a vehicle, which can suitably release a fail-safe condition for an electrically controlled engine power output causing device (for example, an electronically controlled throttle device) only when no trouble will arise.

An aspect of the present invention resides in a fail-safe system for an engine of a vehicle. The fail-safe system comprises a device for causing the engine to generate an engine power output. A detector is provided to detect an operational condition of the causing device so as to generate a detection signal representative of the operational condition. Additionally, a control unit is provided to be programmed to carry out (a) judging that an abnormality arises in the causing device, in accordance with the detection signal from the operational condition detector, so as to make a first judgment result, (b) putting the causing device into a fail-safe condition upon the first judgement result being made, (c) judging that a command for releasing the fail-safe condition is provided, so as to make a second judgment result, (d) judging that the vehicle is in a stopping condition, so as to make a third judgment result, and (e) releasing the fail-safe condition for the causing device upon both the second and third judgment results being made.

Another aspect of the present invention resides in a method of controlling a fail-safe system for an engine of a vehicle. The fail-safe system includes a device for causing the engine to generate an engine power output, and a detector for detecting an operational condition of the causing device so as to generate a detection signal representative of the operational condition. The method comprises (a) judging that an abnormality arises in the causing device, in accordance with the detection signal from the operational condition detector, so as to make a first judgment result, (b) putting the causing device into a fail-safe condition upon the first judgement result being made, (c) judging that a command for releasing the fail-safe condition is provided, so as to make a second judgment result, (d) judging that the vehicle is in a stopping condition, so as to make a third judgment result, and (e) releasing the fail-safe condition for the causing device upon both the second and third judgment results being made.

DETAILED DESCRIPTION OF THE INVENTION

Figure 1:
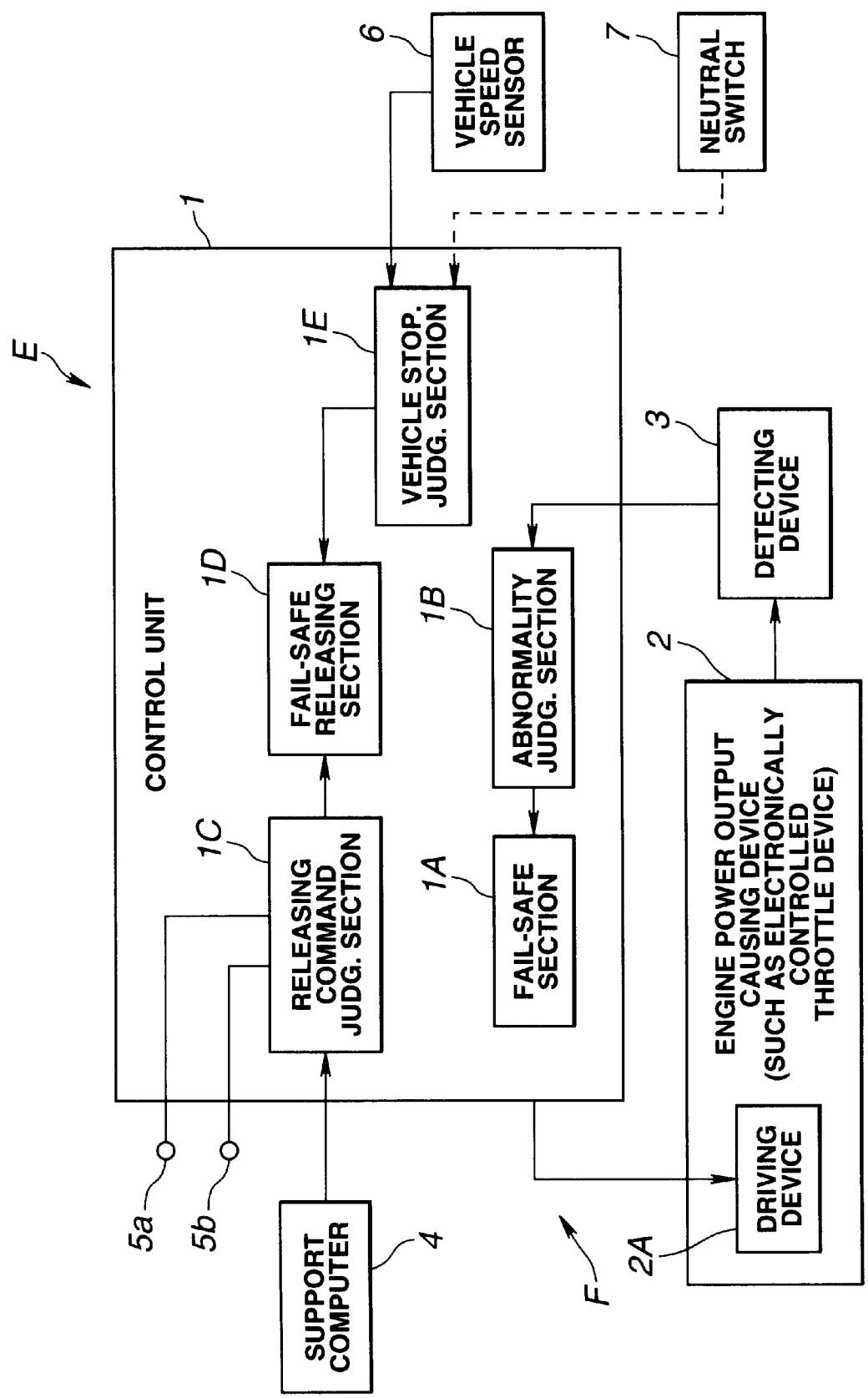
FIG. 1 is a block diagram of an embodiment of a fail-safe system according to the present invention.

Referring now to FIG. 1 of the drawings, an electronic control system E is mounted on a vehicle so as to electronically control an engine power output system including an internal combustion engine (not shown) and engine power output causing device 2 for causing the engine to generate an engine power output. The vehicle is an automotive vehicle in this case. The engine power output causing device 2 includes one relating to fuel injection control (such as an electronically controlled throttle device, or a fuel injector valve), one relating to spark timing control (such as s spark plug), and one relating to idling engine speed control (such as an auxiliary air control valve). The electronically controlled throttle device includes an electronically controlled throttle valve for controlling flow of air to be supplied to engine cylinders (not shown) of the engine. The fuel injector valve is provided to inject fuel to be supplied to the engine cylinders. The spark plug is provided to ignite an air-fuel mixture within the engine cylinder. The auxiliary air control valve is provided in an auxiliary air flow passage bypassing the throttle valve.

The electronic control system E includes a control unit 1 which outputs control signals for electronically controlling operation of the engine and of the engine power output causing device 2. The control unit 1 forms part of a fail-safe system F and electronically controls the fail-safe system F. The fail-safe system F is for the engine power output causing device 2, in this embodiment shown in FIG. 1. The fail-safe system will be discussed on a case where the engine power output causing device 2 is the electronically controlled throttle device. The fail-safe system F comprises a detecting device or detector 3 adapted to detect an operational condition of the engine power output causing device 2. For example, the detecting device 3 is a throttle position or opening degree sensor for detecting an opening degree of the throttle valve of the electronically controlled throttle device.

An abnormality judging section 1B is provided in the control unit 1 and adapted to receive a signal representative of the opening degree of the throttle valve, supplied from the detecting device 3. The abnormality judging section 1B judges as to whether r not a specified abnormality of the engine power output causing device 2 (for example, a trouble of the electronically controlled throttle device) has arisen, in accordance with the signal from the detecting device 3.

A fail-safe section 1A is provided in the control unit 1 and adapted to put the engine power output causing device 2 into a fail-safe condition or mode when the judgement of the abnormality judging section 1B provides such a judgement result that the specified abnormality has arisen. More specifically, a fail-safe signal is fed from the fail-safe section 1A to a driving device 2A for the engine power output causing device 2. The driving device 2A is arranged, for example, to fix the opening degree of a throttle valve (not shown) of the electronically controlled throttle device to a certain small level, to minimize a quantity of fuel injected from the fuel injector valve, or to retard the spark timing of the spark plug thereby lowering the engine power output to a safe low level, upon receiving the fail-safe signal from the fail-safe section 1A. In this embodiment, the driving device 2A is an electric motor for driving the throttle valve of the electronically controlled throttle device.

A release command judging section 1C is provided in the control unit 1 and adapted to judge as to whether or not a command for releasing the fail-safe condition for the engine power output causing device is input or not. The releasing command for releasing the fail-safe condition can be supplied to the release command judging section 1C by a variety of methods. For example, the releasing command is supplied from a support computer 4 to the release command judging section 1C after the trouble has been solved upon repairing the engine power output causing device, for example, in a repair shop. Otherwise, the releasing command may be supplied to the release command judging section 1C by making a short-circuit in a certain pattern between test terminals 5a, 5b provided to the control unit 1, in which modes of the control unit are changed every the short-circuit made. The release command judging section 1C is adapted to output a signal representative of receiving the releasing command.

A vehicle stopping judging section 1E is provided in the control unit 1 and adapted to judge as to whether or not the vehicle is in a stopping condition or at a stop. More specifically, the vehicle stopping judging section 1E provides such a judgment result that the vehicle is in the stopping condition when a vehicle speed of the vehicle is 0 (zero), upon receiving a detection signal (representative of the vehicle speed being 0) from, for example, a vehicle speed sensor 6. Otherwise, such a judgment result that the vehicle is in the stopping condition may be made when a neutral switch 7 is switched ON, upon receiving a detection signal (representative of the neutral switch being switched ON) from a neutral switch condition detecting device (not shown) electrically connected to the neutral switch 7. The neutral switch 7 is adapted to be switched ON when a selector or shift lever for a transmission (not shown) is at a neutral position. The vehicle stopping judging section 1E is adapted to output a signal representative of the vehicle being in the stopping condition, upon the judgment result that the vehicle is in the stopping condition.

A fail-safe releasing section 1D is provided in the control unit 1 and adapted to release the fail-safe condition for the engine power output causing section 2, only upon receiving both the signal (representative of receiving the releasing command) from the release command judging section 1C and the signal (representative of the vehicle being in the stopping condition) from the vehicle stopping judging section 1E. In other words, according to the present invention, even if the releasing command for releasing the fail-safe condition is provided, releasing the fail-safe condition is not carried out when the vehicle is running or cruising.

Figure 2:
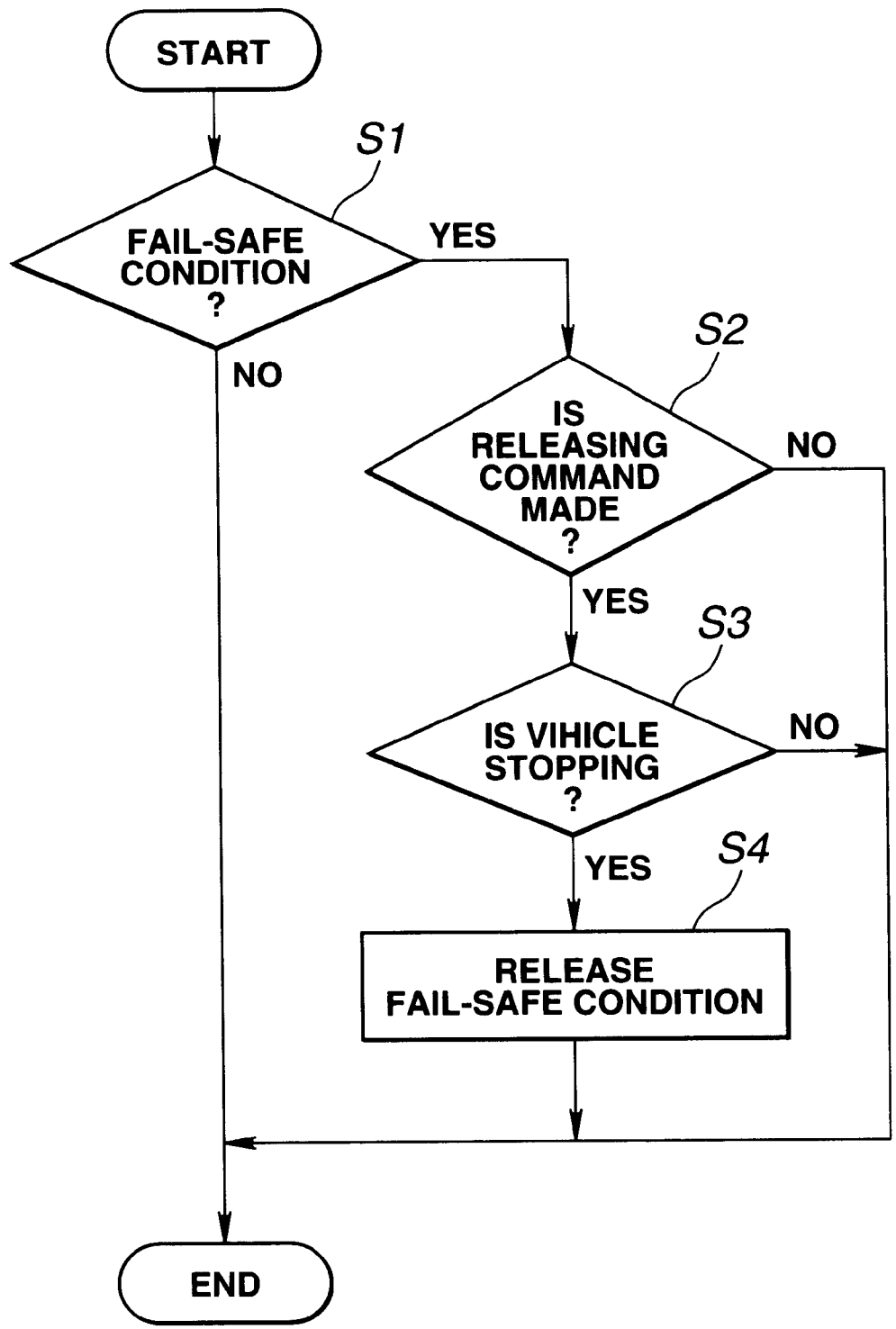
FIG. 2 is a flowchart of a control routine for releasing a fail-safe condition established in the fail-safe system of FIG. 1.

Next, a manner of control for releasing the fail-safe condition in the fail-safe system F will be discussed with reference to a flowchart in FIG. 2.

At a step S1, a judgment is made as to whether the fail-safe condition has been established in the engine power output causing device 2. When the judgment provides such a judgment result that no fail-safe condition has been established, a flow of a routine of this control is terminated. When the judgement provides such a judgment result that the fail-safe condition has been established, the flow of the routine goes to a step S2.

At the step S2, the release command judging section 1C judges as to whether releasing command for releasing the fail-safe condition is made or not. When the release command judging section 1C makes such a judgment result that no releasing command is provided, the routine of the control is terminated as it is. When the release command judging section 1C makes such a judgment result that the releasing command is provided, the flow of the routine goes to a step S3.

At the step S3, the vehicle stopping judging section 1E judges as to whether or not the vehicle is at a stop or in the stopping condition. When the vehicle stopping judging section 1E makes such a judgment result that the vehicle is in the stopping condition, the flow of the routine goes to a step S4 at which the fail-safe releasing section 1D releases the fail-safe condition of the engine power output causing device 2, and then the routine of the control is terminated. When the vehicle stopping judging section 1E makes such a judgment result that the vehicle is not in the stopping condition, the flow of the routine is terminated as it is. In other words, as long as the vehicle is at a stop, the fail-safe condition of the engine power output causing device 2 is not released, terminating the flow of the routine.

Next, operation and effects of the whole fail-sail system F will be discussed.

In the electronic control system E for the engine, the control unit 1 outputs the control signals to the driving section 2A (for example, the electric motor for driving the throttle valve) for the engine power output causing device 2 (for example, the electronically controlled throttle device having the throttle valve). The driving section 2A controls the engine power output causing device 2, in accordance with the control signals. The operational condition of the engine power output causing device 2 is detected by the detecting device 3. In accordance with the thus detected operational condition of the engine power output causing device 2, the abnormality judging section 1B can judge such that the specified abnormality or trouble arises in the engine power output causing device 2. When a result of the judgement is made such that the certain abnormality arises in the engine power output causing device 2, the fail-safe section 1A puts the engine power output causing device 2 into the fail-safe condition, for example, thereby compulsorily lowering a power output generated by the engine to a safe low level.

Such a fail-safe condition can be released by providing the control unit 1 with the releasing command for releasing the fail-safe condition. Providing the control unit 1 with the releasing command is accomplished by supplying a signal representative of the releasing command from the support computer 4, or by making the short-circuit in a certain pattern between the test terminals 5a, 5b. According to the present invention, even in the event that the releasing command is supplied to the release command judging section 1C so that the release command judging section 1C makes such a judgment result that the releasing command is made, the fail-safe releasing section 1D cannot release the fail-safe condition of the engine power output causing device 2 as long as it has been not confirmed that the vehicle is at a stop upon judgment of the vehicle stopping judging section 1C. More specifically, releasing the fail-safe condition is not accomplished upon the vehicle stopping judging section 1E making such a judgment result that the vehicle is not at a stop, for example, when the vehicle speed is not 0, or the neutral switch is not switched ON.

As a result, when the vehicle is running or cruising, the fail-safe condition for the engine power output causing device 2 cannot be released even if an operation for releasing the fail-safe condition is erroneously made, or the release command judging section 1C erroneously makes such a judgment result that the releasing command for releasing the fail-safe condition is provided under the action of bug or noise in a control program.

It will be understood that an operation for releasing the fail-safe condition for the engine power output causing device 2 is usually accomplished in the stopping condition of the vehicle, for example, after repairing the engine power output causing device 2 has been made in a repair shop. Therefore, no problems will arise in usual operations for releasing the fail-safe condition even though releasing the fail-safe condition is made impossible during running or cruising of the vehicle.

The entire contents of Japanese Patent Application P10-238417 (filed Aug. 25, 1998) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A fail-safe system for an engine of a vehicle, comprising:
    a device for causing the engine to generate an engine power output;
    a detector for detecting an operational condition of said causing device so as to generate a detection signal representative of the operational condition; and
    a control unit programmed to carry out
    judging that an abnormality arises in said causing device, in accordance with the detection signal from said operational condition detector, so as to make a first judgment result,
    putting said causing device into a fail-safe condition upon said first judgement result being made,
    judging that a command for releasing the fail-safe condition is provided, so as to make a second judgment result,
    judging that the vehicle is in a stopping condition, so as to make a third judgment result, and
    releasing the fail-safe condition for said causing device upon both said second and third judgment results being made.

2. A fail-safe system as claimed in claim 1, wherein said causing device includes an electronically controlled throttle device, wherein the abnormality arising in said causing device includes an abnormality arising in said electronically controlled throttle device.

3. A fail-safe system as claimed in claim 1, wherein said causing device is controlled to lower the engine power output generated by the engine, to a safe low level, in the fail-safe condition.

4. A fail-safe system as claimed in claim 1, further comprising a vehicle speed sensor for detecting a vehicle speed of the vehicle, wherein the third judgment result is made upon detection of the vehicle speed being zero.

5. A fail-safe system as claimed in claim 1, further comprising a neutral switch adapted to be switched ON upon a selector lever for a transmission being put into a neutral position, wherein the third judgment result is made upon detection of the neutral switch being switched ON.

6. A fail-safe system for an engine of a vehicle, comprising:
    a device for causing the engine to generate an engine power output;
    a detector for detecting an operational condition of said causing device so as to generate a detection signal representative of the operational condition;
    means for judging that an abnormality arises in said causing device, in accordance with the detection signal from said operational condition detector, so as to make a first judgment result;
    means for putting said causing device into a fail-safe condition upon said first judgement result being made;
    means for judging that a command for releasing the fail-safe condition is provided, so as to make a second judgment result,
    means for judging that the vehicle is in a stopping condition, so as to make a third judgment result; and
    means for releasing the fail-safe condition for said causing device upon both said second and third judgment results being made.

7. A method of controlling a fail-safe system for an engine of a vehicle, the fail-safe system including a device for causing the engine to generate an engine power output, and a detector for detecting an operational condition of said causing device so as to generate a detection signal representative of the operational condition, said method comprising:
    judging that an abnormality arises in said causing device, in accordance with the detection signal from said operational condition detector, so as to make a first judgment result,
    putting said causing device into a fail-safe condition upon said first judgement result being made,
    judging that a command for releasing the fail-safe condition is provided, so as to make a second judgment result,
    judging that the vehicle is in a stopping condition, so as to make a third judgment result, and
    releasing the fail-safe condition for said causing device upon both said second and third judgment results being made.

* * * * *